(12) United States Patent
Utter et al.

(10) Patent No.: US 12,187,107 B2
(45) Date of Patent: Jan. 7, 2025

(54) SOFT TOP MOUNT AND ACCESSORY RAIL FOR RECREATIONAL VEHICLES

(71) Applicant: Polaris Industries Inc., Medina, MN (US)

(72) Inventors: Brian T. Utter, Greenbush, MN (US); James A. J. Holroyd, Stillwater, MN (US); Scott T. Mazour, Detroit Lakes, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/435,130

(22) Filed: Feb. 7, 2024

(65) Prior Publication Data

US 2024/0174062 A1 May 30, 2024

Related U.S. Application Data

(63) Continuation of application No. 17/720,934, filed on Apr. 14, 2022, now Pat. No. 11,897,321.

(60) Provisional application No. 63/175,881, filed on Apr. 16, 2021.

(51) Int. Cl.
*B60J 7/10* (2006.01)

(52) U.S. Cl.
CPC .................... *B60J 7/106* (2013.01)

(58) Field of Classification Search
CPC ... B60J 7/106; B60J 7/104; B60J 7/102; B60J 7/0007; B60J 7/1858; B60J 7/10; B60J 7/1291; B60J 7/085; B60J 5/08; B60J 5/0487; B60R 21/13

USPC ............ 296/210, 214, 37.7, 71, 180.2, 1.07, 296/216.07, 102
See application file for complete search history.

(56) References Cited

U.S. PATENT DOCUMENTS

| | | | |
|---|---|---|---|
| 4,065,041 A | 12/1977 | Stegavig et al. | |
| 4,830,037 A | 5/1989 | Held | |
| 4,950,017 A * | 8/1990 | Norton | B62J 17/086 296/102 |
| 5,190,340 A | 3/1993 | Nuscher | |
| 6,416,108 B1 * | 7/2002 | Elswick | B62K 5/01 296/210 |
| 6,530,617 B2 * | 3/2003 | McElwee | B62D 33/0621 296/136.03 |
| 6,530,621 B1 * | 3/2003 | Williams | B60R 9/00 296/147 |
| 6,543,830 B1 | 4/2003 | Stuck | |
| 6,908,107 B2 | 6/2005 | Barth | |

(Continued)

*Primary Examiner* — Amy R Weisberg
*Assistant Examiner* — Veronica M Shull
(74) *Attorney, Agent, or Firm* — Christensen, Fonder, Dardi & Herbert PLLC

(57) ABSTRACT

A recreational vehicle with side by side seating has or can receive an overhead tubular framework with an accessory rail removably attached to an overhead cross member of the tubular framework. The accessory rail providing an anchor for a forward edge of a soft top with the soft top wrapping around the overhead cross member and extending rearwardly and being supported by and secured to the tubular framework. The soft top covering the side by side seating region. The accessory rail having the anchor for the soft top, an interface for engaging the cross member, and an accessory mounting portion with variable positioning and attachment of an array of accessories above and forward of the side by side seating region.

20 Claims, 7 Drawing Sheets

(56) References Cited

U.S. PATENT DOCUMENTS

| | | |
|---|---|---|
| 7,137,660 B2 | 11/2006 | Weddington et al. |
| 7,819,220 B2 | 10/2010 | Sunsdahl et al. |
| 8,087,694 B2* | 1/2012 | Johnson .................. B62K 5/01 |
| | | 297/485 |
| 8,382,125 B2 | 2/2013 | Sunsdahl et al. |
| 8,579,354 B2* | 11/2013 | Cimatti ................. B60J 7/1851 |
| | | 296/102 |
| 8,596,405 B2 | 12/2013 | Sunsdahl et al. |
| 8,695,746 B2 | 4/2014 | Holroyd et al. |
| D711,778 S | 8/2014 | Chun et al. |
| 9,028,185 B2 | 5/2015 | Eggers et al. |
| 9,499,033 B1 | 11/2016 | Nixon et al. |
| 9,527,532 B2 | 12/2016 | Holroyd et al. |
| 9,651,080 B2 | 5/2017 | Eggers et al. |
| 9,776,481 B2 | 10/2017 | Deckard et al. |
| 10,144,273 B2* | 12/2018 | Carlson ...................... B60J 7/10 |
| 10,730,551 B2 | 8/2020 | Borud |
| 11,007,852 B2* | 5/2021 | Wilson, III ............. B60R 21/13 |
| 11,446,990 B2* | 9/2022 | Bell ......................... B60J 5/067 |
| 2002/0089207 A1 | 7/2002 | Bayerle et al. |
| 2018/0156381 A1* | 6/2018 | Gulledge ............... B60Q 3/267 |
| 2018/0304731 A1 | 10/2018 | Lewis et al. |
| 2019/0031003 A1* | 1/2019 | Bennett ................... B60J 7/104 |
| 2020/0238901 A1 | 7/2020 | Troeger et al. |
| 2022/0332175 A1 | 10/2022 | Utter et al. |

* cited by examiner

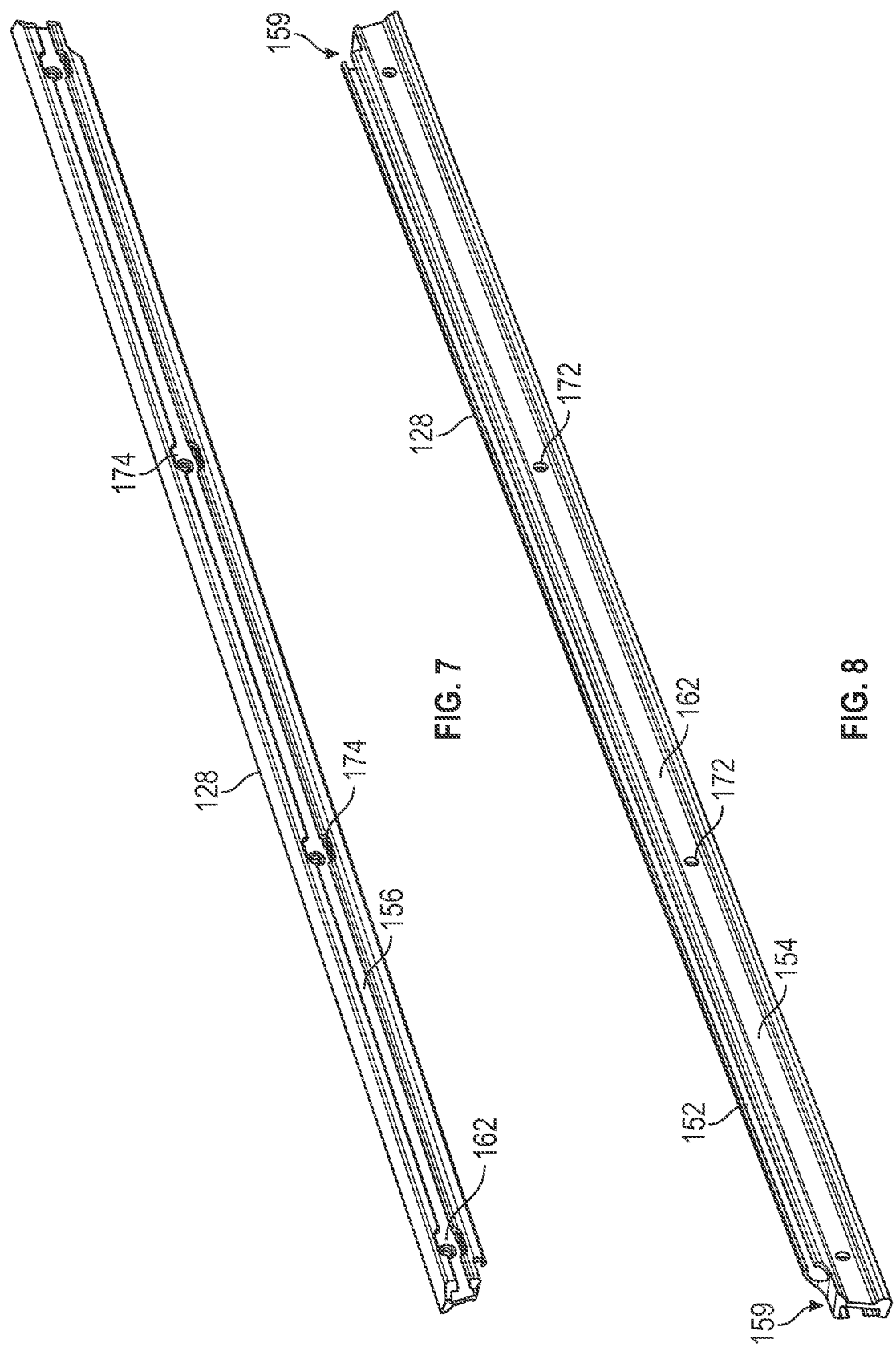

SOFT TOP MOUNT AND ACCESSORY RAIL FOR RECREATIONAL VEHICLES

CROSS REFERENCE TO RELATED APPLICATIONS

This application claims the benefit of U.S. application Ser. No. 17/720,934 filed on Apr. 14, 2022, which claims benefit to U.S. Provisional Application No. 63/175,881, filed Apr. 16, 2021, the entire contents of both applications are incorporated by reference herein.

BACKGROUND OF THE INVENTION

Recreational sport vehicles with side by side seating, may be intended for use on-road and off-road. Such vehicles are often modified by users to add accessories. The accessories are ideally easily attached and removed as desired by the user without damage to the vehicle and ideally without any permanent alteration of the vehicles. For example, newly drilled holes, scratches, or indentations in painted steel components can be a source for rusting. Moreover, it is desirable that any attachment interfaces for attaching accessories to such side by side sport vehicles add minimal weight to the vehicle and provide flexibility in positioning of accessories and in the types of accessories to be attached.

SUMMARY OF THE INVENTION

A recreational vehicle with side by side seating has or can receive an overhead tubular framework with an accessory rail removably attached to an overhead cross member of the tubular framework. The accessory rail providing an anchor for a forward edge of a soft top with the soft top wrapping around the overhead cross member and extending rearwardly about and supported by and secured to the tubular framework. The soft top extending over the side by side seating region. The accessory rail having three functional portions positioned circumferentially about an axis of the rail. A first functional portion providing the fixed anchor for the forward edge of the soft top, a second functional portion providing interface and attachment features for connecting the rail to the overhead cross member, and a third functional portion providing accessory mounting with variable positioning and attachment of an array of accessories above and forward of the side by side seating region.

In embodiments, the rail is removably attached to the tubular cross member at the interface portion of the rail. The interface portion having a pair of forwardly extending divergent interface projections. The pair of interface projections extending substantially the length of the rail and contacting the tubular cross member along said length. A plurality of holes through a base region intermediate the divergent projections have screws extending therethrough and into the tubular cross member, thereby securing the rail to the tubular cross member. A feature and advantage of embodiments is that each of the divergent interface projections may be configured for providing minimally disruptive engagement to the exterior surface of the tubular cross member such as having surfaces conforming to the cylindrical surface of the tubular member.

The accessory mounting portion may be provided by a pair of projections with the ends of the projections confronting one another and defining a slot with a narrow opening and a wider interior region, for example a T-shaped slot. The slot configured to receive threaded fasteners such as a plurality of T-nuts or threaded bolts with heads retained in the wider interior region of the slot. The threaded fasteners each being slidably positionable along the length of the rail in the slot. Each of the T-nuts providing a female threaded connection for attachment of desired accessories forward of the side by side seating region, such as sun visors, cameras, lights, map holders, and electronic devices with user interfaces. The bolts providing a threaded male connection.

In embodiments, the accessory mounting portion may be C-shaped in cross section with two legs extending outwardly with distal portions of the two legs confronting one another and defining an opening of the T-slot, the opening of the T-slot extending the length of the rail and may have a plurality of enlarged opening regions defined by cutaway portions on the distal portions of the two legs that provide access ports for installing or removing the T-nuts or other threaded fasteners and/or for insertion of the screws for attachment of the rail to the tubular member.

In embodiments, the accessory mounting portion and the tubular interface portion have a common base portion with a uniform thickness. The base portion having the plurality of holes in linear alignment spaced along the rail for insertion of the screws for attachment of the rail to the tubular cross member. A feature and advantage of embodiments is that each functional portion of the accessory rail has structure that is shared by the adjacent functional portion providing minimal use of material, compactness, and elegance of design.

The tubular cross member may be steel member with a plurality of linearly aligned threaded connection portions that are exposed rearwardly on the recreational vehicle. The threaded connection portions may be provided by a plurality of threaded metal inserts positioned in a plurality of aligned holes in the tubular cross member, the inserts clamped to the tubular wall of the tubular cross member.

In embodiments, the tubular cross member also engages an interior surface of the flexible soft top, the flexible soft top having an enlarged forward edge that seats in and is retained by a lower slot of the rail. The soft top extending around the bottom side, the forward side, and the top side of the tubular cross member. Side edge portions and rearward edge portions of the soft top may be attached by conventional means to portions of the framework or to other locations on the vehicle In embodiments, the tubular cross member is one member of an overhead framework of tubular members that is attached to the vehicle behind the side by side seating area, that extends over the side by side seating area of the recreational vehicle, and that is attached to the vehicle forward of the seating area. The attachment may be directly to the vehicle frame or chassis such as by bolting or may be attached through intermediary components such as rigid brackets and/or flanges.

In embodiments, the rail interface may be provided part of a kit that includes a soft top. In embodiments, the kit may include the tubular cross member with the spaced threaded portions. In embodiments, the kit may include an overhead framework of steel tubular members including the tubular cross member with threaded connection portions linearly aligned and spaced along the tubular steel cross member. In embodiments, the steel tubular cross member that receives the accessory rail has the holes drilled before painting, including powder coating, of the tubular cross member and/or overhead framework, and before installation of threaded fasteners with female threads in the holes.

In embodiments, the framework may be adapted for a specific recreational vehicle and connecting portions of the framework may be specifically adapted for existing specific components of the recreational vehicle. In embodiments, components, may be removed providing an attachment interface for the framework. For example, existing recreational vehicles with side by side seating have roll hoops mounted behind each seat of the side by side seating, the roll hoops each having a flange that is bolted to the vehicle chassis or framework at a chassis interface. In embodiments, the roll hoops may be removed and the framework attached to the chassis interface. In embodiments, the framework and roll hoops can both be attached to the chassis interface.

A feature and advantage of embodiments is that a tubular contact portion with spaced interface portions, an anchor for a soft top, and an accessory attachment interface are all provided in a single unitary rail that may be conveniently formed by extruding aluminum. Additional machining operations are minimal and readily accomplished. The aluminum providing a non-corrosive base, a "soft" metal less inclined to damage the steel tubular cross member to which it is attached, and generally provides a high strength, low weight, easy to manufacture solution.

A feature and advantage of embodiments of the invention is a robust accessory attachment means that is easily attached to a support member with minimal tools and effort, that may be easily removed with minimal or no surface damage, that provides minimal added weight, that is non-obtrusive, and that generally provides a high level of flexibility in accessory attachments, position-wise and in the type of accessory.

DESCRIPTION OF THE FIGURES

FIG. 7 is a front side perspective view of accessory rail of FIGS. 4 and 5.

FIG. 8 is a perspective view of the accessory rail of FIG. 7 from the opposite side.

DETAILED DESCRIPTION

Figure 1:
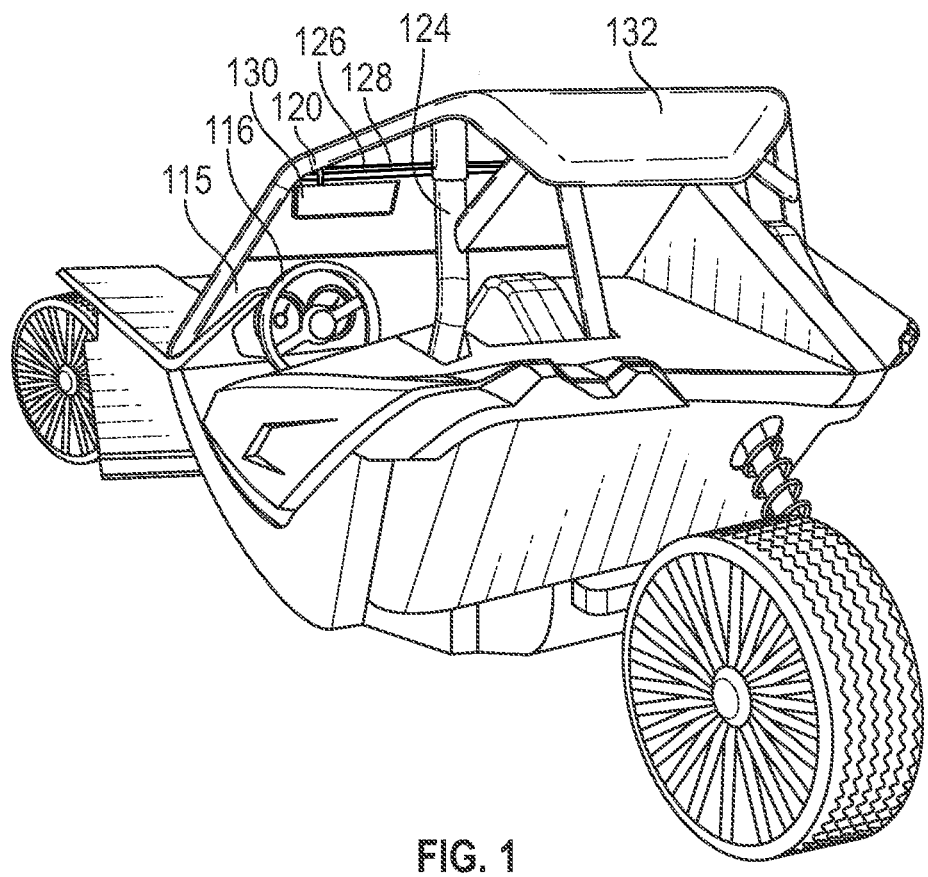
FIG. 1 is a rear perspective view of a recreational vehicle with accessories mounted to a cross member forward and above the rider seating.
Figure 2:
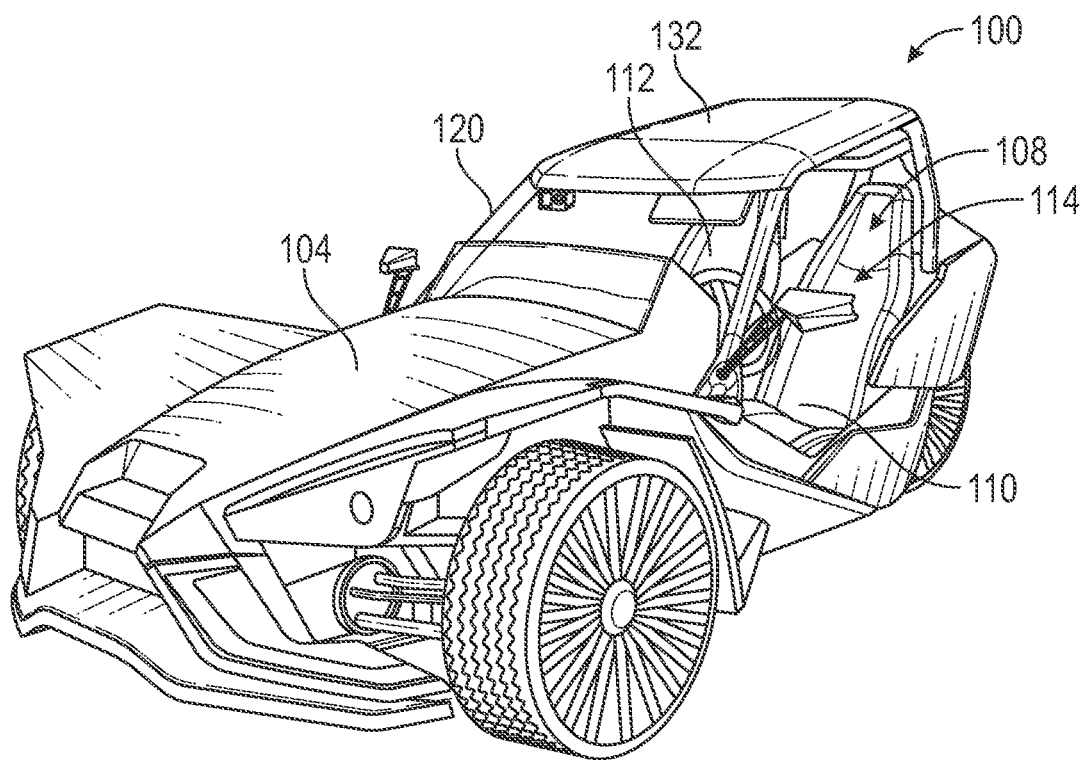
FIG. 2 is a front perspective view of the recreation vehicle of FIG. 1.

Referring to FIGS. 1 and 2, a three wheeled recreational vehicle 100, has a body 104 with a rider compartment 108 having a pair of side by side seats 110, 112 therein defining a seating region 114. The vehicle has a dashboard 115 and steering wheel 116 in front of the driver's seat 110. An overhead framework 120 formed of tubular members 124 extends over the seating region and includes a forwardmost tubular cross member 126 above and forward of the seating region 114. An accessory rail 128 is attached to the tubular cross member and accessories 130 extend therefrom including a visor and a camera. A soft top 132 wraps around the forwardmost tubular cross member 126 and extends rearwardly over the framework and is supported by and secured to the framework. The soft top providing a cover over the seating region.

Figure 3:
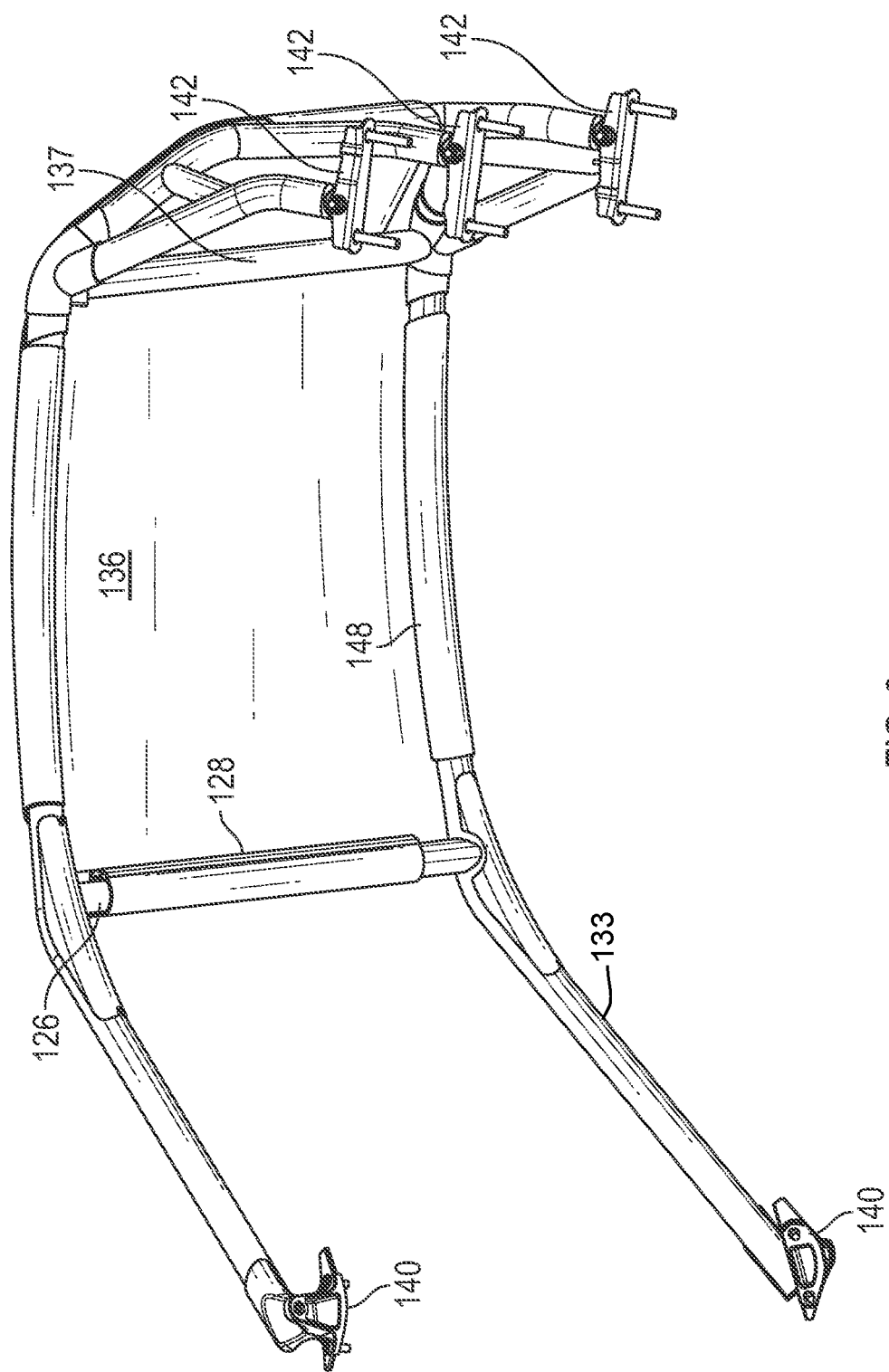
FIG. 3 is an overhead tubular framework with a tubular cross member supporting an accessory rail and with a soft top connecting to the accessory rail.
Figure 4:
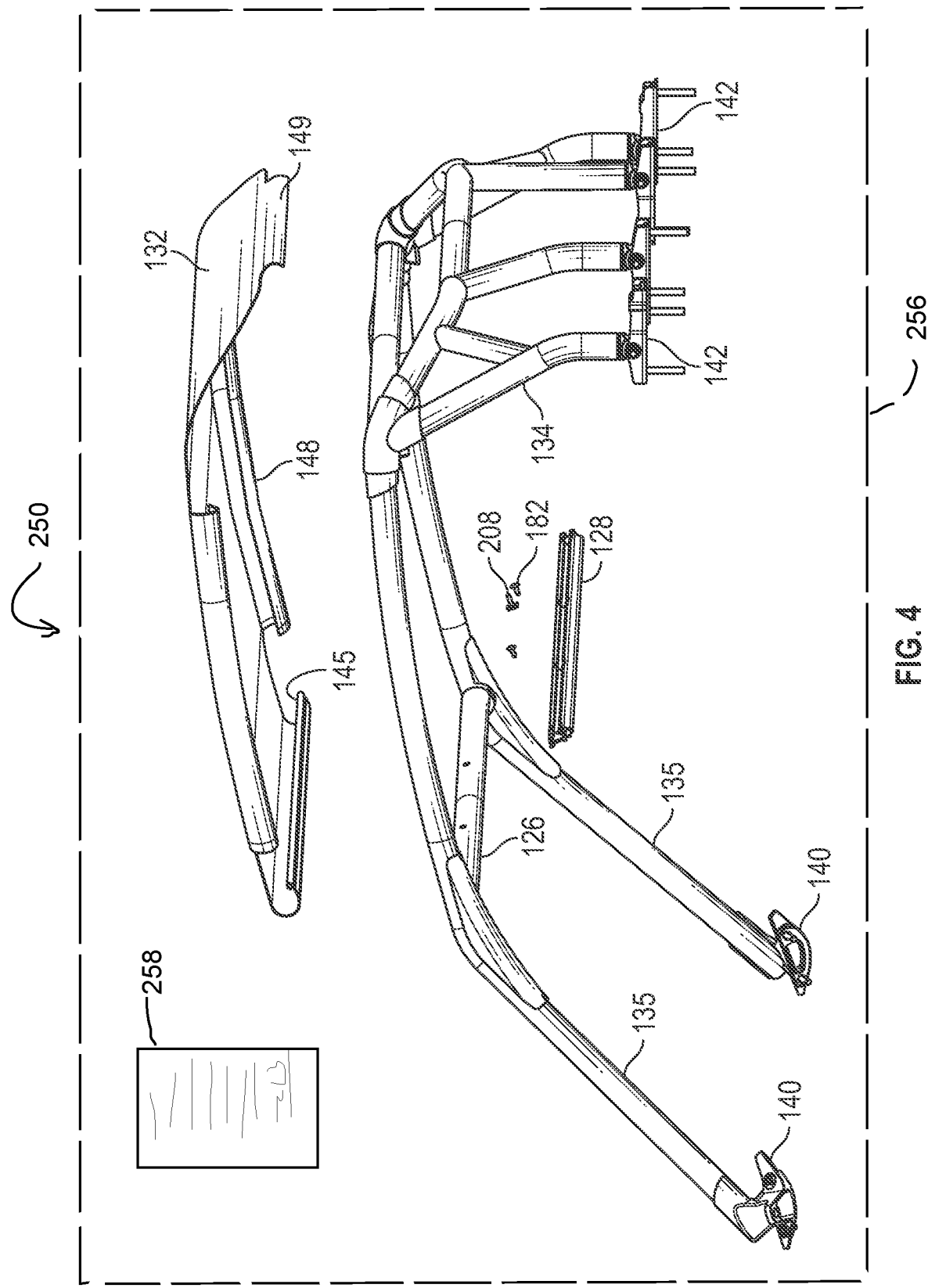
FIG. 4 is an exploded view of the tubular framework of FIG. 3 with the soft top and accessory rail separated. This figure also diagrammatically depicts a kit of components as disclosed herein.

Referring to FIGS. 3 and 4, further detail of the framework, soft top 132 and accessory attachment means are illustrated. The framework 120 is formed of steel tubing members 133 welded together, including rearward upright members 134, forward inclined members 135, cross members 137, and forward rearward members 138, all welded together. The framework further includes attachment flanges 140, 142 forwardly and rearwardly for attachment to the vehicle frame. See U.S. Pat. Nos. 8,695,746 and 9,527,532 illustrating three-wheeled vehicle frameworks and suitable attachment location for the overhead framework. These patents are owned by the owner of the instant application and are incorporated herein by reference for all purposes.

The soft top 132 may be formed of flexible waterproof fabric and has a forward edge that is looped over itself with a spacer placed therein and is stitched together to form an enlarged forward edge portion 145 as shown in FIG. 4. The enlarged forward edge portion 145 is retained in the accessory rail 128 as described in further detail below. The side edge portions 148 and rear edge portions 149 of the soft top may be secured to the framework by snaps, hook and loop material, straps or other means known in the art.

Figure 9:
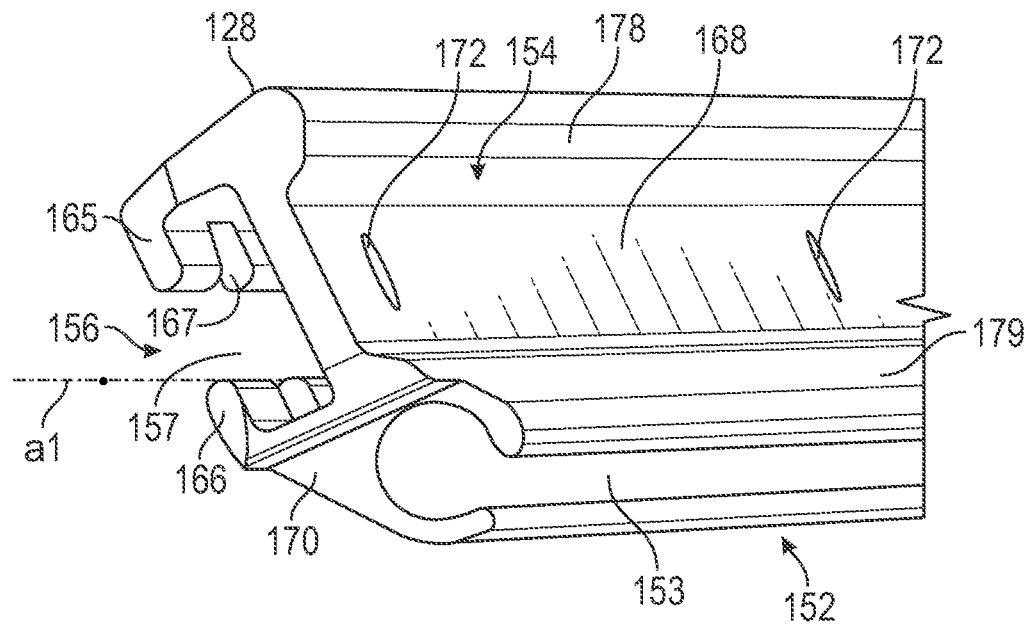
FIG. 9 is a perspective view of the end of the accessory rail of FIGS. 6-8.
Figure 10:
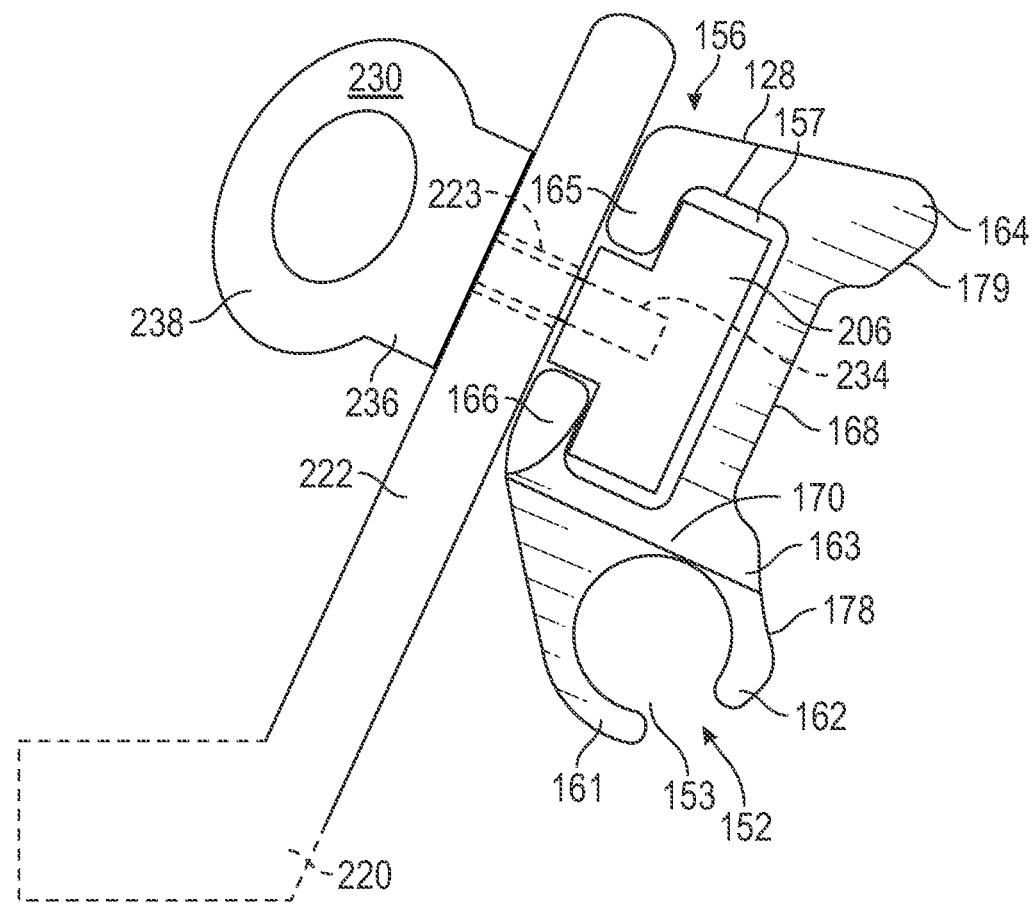
FIG. 10 is an end elevation view of the accessory rail of FIGS. 6-9 and illustrating the attachment of a generic accessory using a T-nut in the T-slot of the accessory rail.

Referring to FIGS. 5-10, details of the accessory rail are illustrated. The accessory rail may be conveniently manufactured by extruding aluminum in the profile as best shown in FIGS. 9 and 10. The rail has an axis a1 that runs lengthwise and further has three functional portions radially positioned about the rail: an soft top anchoring portion 152 for the forward edge portion of the soft top; an interface portion 154 for engaging the tubular cross member; and an accessory mounting portion 156 with T-slot 157 for attaching accessories. The soft top anchoring portion 152 defining slot 153 extends slightly less than the overall length of the rail, as best illustrated by FIG. 8 allowing entry regions 159 for the enlarged forward edge portion 145 of the soft top. The cross member interface portion 154 extends the entire length of the rail as does the accessory mounting portion 156. Each of the three portions can be described as being C-shaped in the cross section or from the end view. The projections 161, 162 or legs of the C-shape of the soft top anchoring portion converging and being arcuate, the projections 163, 164 or legs of the C-shape of the tubular cross member interface portion diverging, and the projections 165, 166 or legs of the C-shape of the accessory mounting portion having an interior right angle and directly confronting one another.

In addition to each functional portion being circumferentially spaced about the rail, each functional portion has a "shared" portion of the accessory rail with the adjacent functional portions, providing an efficiency in use of material and an elegance in the design. The soft top anchoring portion 152 share portions of a common leg 162, 163 with the tubular cross member interface portion, the cross member interface portion and the accessory mounting portion share a common base portion 168, and the soft top anchoring portion 152 and the accessory mounting portion share a common base portion 170.

The rail will need minimal machining operations after extruding the rail and cutting it to size. The soft top edge anchoring portion will need the end portions machined off for providing the entry regions 159, a base portion 168 common to the cross member interface portion and the accessory mounting portion will need holes 172 drilled, and the confronting projections of the accessory mounting portion will need material removed for forming the enlarged T-slot access 174.

Figure 5:
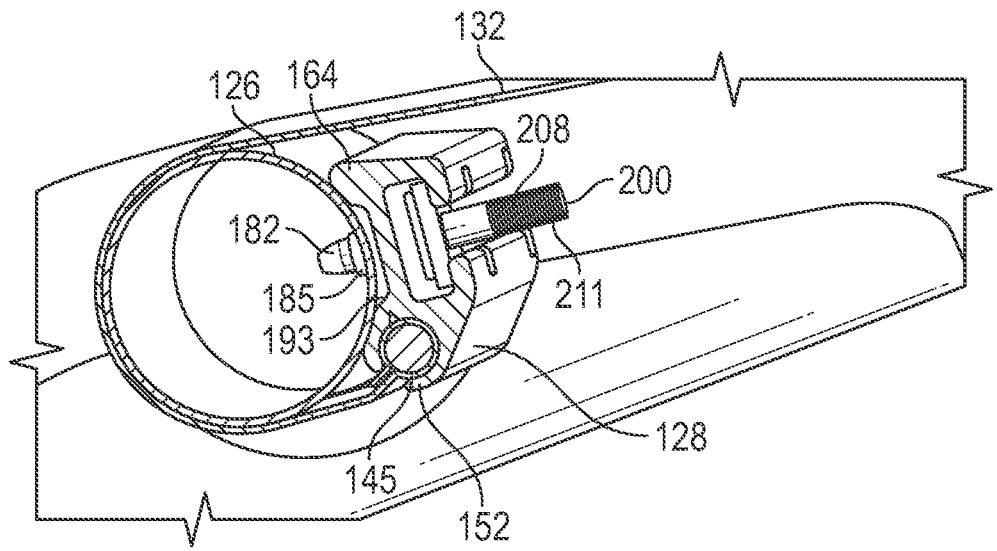
FIG. 5 is a cross sectional view through a tubular cross member with an accessory rail attached thereto.
Figure 6A:
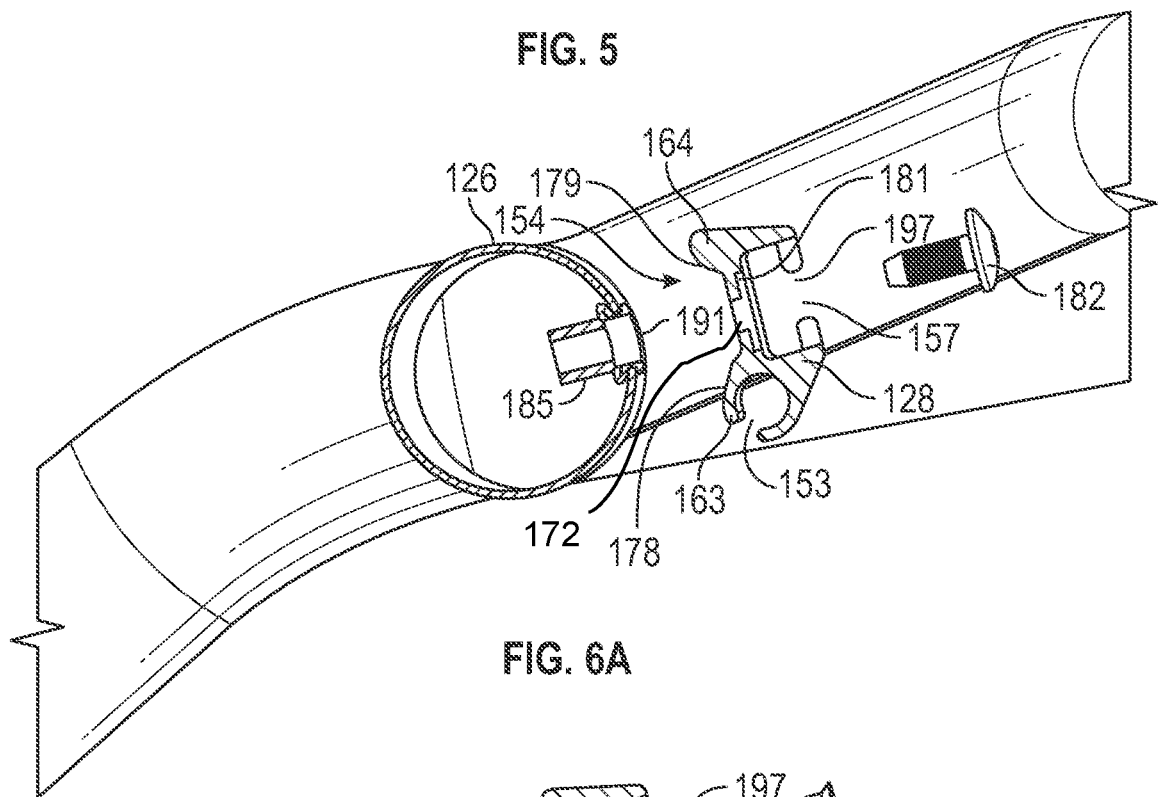
FIG. 6A is an exploded view of the cross section of FIG. 5.
Figure 6B:
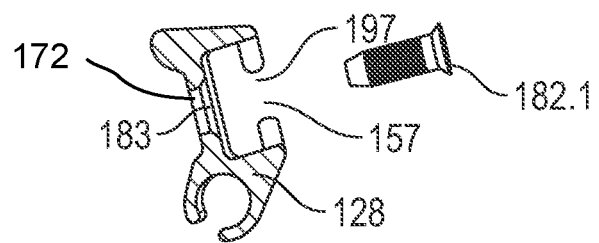
FIG. 6B is an exploded view showing another screw and accessory rail.
Figure 14:
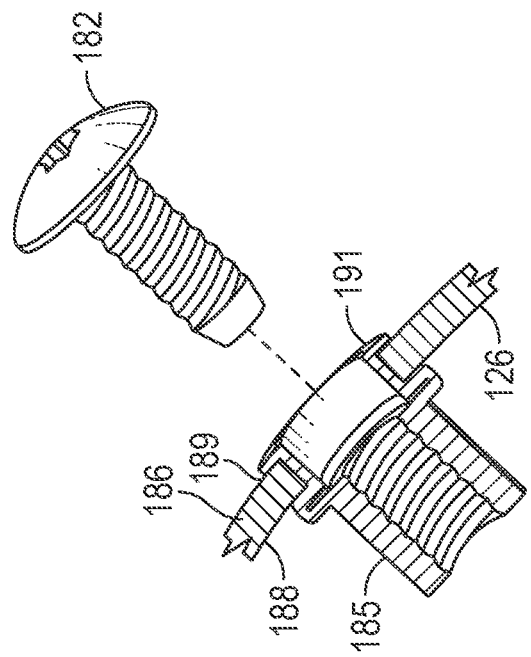
FIG. 14 is a cross sectional view of the rivet nut of FIG. 13, secured in a hole in the tubular cross member and the screw for securing the accessory rail thereto.
Figure 13:
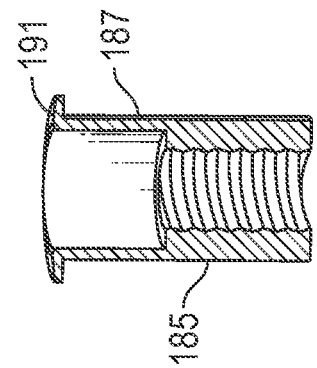
FIG. 13 is a cross sectional view of a rivet nut.

Referring to FIGS. 5 to 6B, further detail of the assembly of the accessory rail 128 to the tubular cross member is illustrated. In embodiments, the cross member interface portion 154 of the accessory rail has a pair of spaced contact surfaces 178, 179 on the two divergent projections 163, 164 that extend the entire length or substantially the entire length of the accessory rail. In embodiments, the surfaces are shaped to be conforming or for otherwise providing a minimal or non-damaging engagement. For example, in embodiments, the contact portions have no sharp edges, corners, or projections that engage the surface of the tubular cross member. The accessory rail may be secured to the tubular cross member with threaded fasteners, such as screws 182, 182.1 that are inserted through the holes 172 in the accessory rail and then is inserted into the tubular cross member 126. The holes 172 may be positioned at the enlarged access 174 to the T-slot 157. Referring also to FIGS. 13 and 14, in embodiments, the screws may be received by threaded metal inserts 185 that are inserted into holes in the tubular cross member 126 and which are clamped to the wall 186 of the tubular cross member 126 utilizing a tool, known in the art and not shown, that outwardly collapses the thin walled portion 187 to clamp the insert to the interior wall surface 188 and the exterior wall surface 189 of the cross member. Such inserts are known as rivet nuts and may have anti-rotation features. See U.S. Pat. Nos. 9,651,080 and 9,028,185, each of which are incorporated by reference herein. The accessory rail 128 may have counterbores 181, 183 at the holes 172 to allow the screws 182, 182.1 to seat flush or have a reduced head projection.

The threaded metal inserts 185 have an exterior head or flange 191 engaged with the exterior surface 189 of the tubular cross member and projecting slightly radially outward therefrom. The gap 193 between the interface portion projections 163, 164 accommodates the exterior head 191 of the threaded metal insert. The rail can be sized such that the screws 182 can be tightened to slightly flex the base portion and/or the two divergent projections 163, 164 to bring the base portion into contact with the head of the threaded metal insert.

Referring to FIGS. 4-10, the enlarged forward edge portion 145 of the soft top 132 is received in the slot 153 of the soft top anchoring portion 152 of the accessory rail 128. The edge portion 145 is sized for retention in the slot with the slot opening 194 being less than the thickness of the enlarged forward edge portion. The enlarged edge portion may be inserted into the slot by way of the entry regions 159, best shown on FIG. 8.

Figure 12:
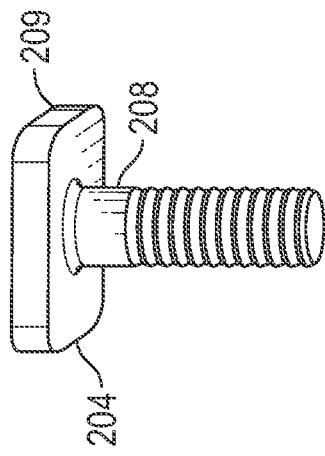
FIG. 12 is a perspective view of a T bolt.
Figure 11:
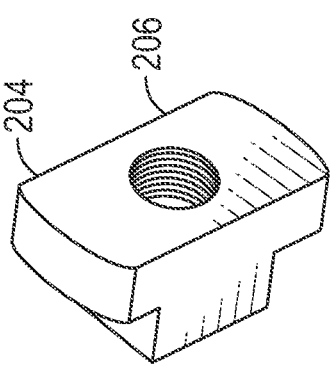
FIG. 11 is a perspective view of a T-nut.

Referring generally to FIGS. 2-10, the accessory mounting portion 156 of the accessory rail 128 may be configured as a T-slot 157, with the projections or legs 165, 166 defining the slot and the slot opening 197. In embodiments, the T-slot extends the entire length of the rail 128 or substantially the entire length of the rail. Referring additionally to FIGS. 11 and 12, the accessory mounting portion provides a threaded, position adjustable connection point 200 by way of threaded fasteners 204, which may be configured as a T-nut 206 or as a bolt 208 with a square head 209. The threaded fasteners cooperate with and slidingly fit into the T-slot 157 such as at the T-groove access 174. FIG. 5 illustrates the connection point 200 configured as male threaded member 211, part of the bolt 208 that provides the adjustable positioning of accessories.

Referring to FIG. 10, an end view of the accessory rail 128 and a generic accessory 220 are shown in isolation, that is, not connected to the tubular cross member for illustration purposes. A T-nut 219 slidably positioned in the T-slot 157 provides a threaded female connection. An accessory 220, having an accessory mounting bracket 222 with a hole 223 is positioned at the T-nut and in contact with the accessory rail and a manual attachment screw member 230 with a male threaded shaft 234, a flange 236, and a manual handle 238 extends through a hole 241 in the accessory mounting flange and threadingly engages the T-nut. By manual rotation of the handle, the flange clamps the legs 165, 166 of the accessory mounting portion between the T-nut and the flange, thereby locking the position of the accessory in place. Positional adjustment can be accomplished by slightly loosening the manual attachment screw member and sliding the T-nut and accessory axially on the accessory rail to a desired location where the screw member is again tightened.

Similarly, as illustrated in FIG. 5, the bolt 208 with the square head can provide a threaded male member projecting from the accessory rail to which the accessory bracket 222 may be attached and retained with a nut. The square or rectangular head allowing positioning of the male threaded member by sliding the threaded member in the slot but not allowing rotation so that the accessory and female threaded connector may be easily attached.

Referring to FIG. 4, the components herein may be provided as a kit 250 enclosed in packaging 256, such as a cardboard box, and including instructions 258 for assembly and/or attachment to the recreational vehicle included in the kit. The components may be as shown in FIG. 4, or any subset of the components.

Recreational vehicles with side by side seating also include utility vehicles and all terrain vehicles such as shown in U.S. Pat. Nos. 10,730,551; 9,776,481; 8,596,405; 8,382,125; 7,819,220; and D711,778. These patents are incorporated by reference herein for all purposes. These vehicles may have existing cross members extending forwardly and above the seating regions that may or may not be tubular. An existing recreational vehicle may have an existing rigid or soft roof and the accessory rail as disclosed herein may be utilized for adding accessories forward and above the seating region. Aspects of the invention herein are suitable for mounting accessories forward of the seating region on these vehicles and/or a soft top over the seating region. Also, sec U.S. Pat. Nos. 7,137,660; 6,543,830; and Pat. Publ. No. 2002/0089207. These patents and publication are incorporated by reference herein for all purposes.

All the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

The invention claimed is:

1. A kit for adding a soft top and accessories to a recreational vehicle, the kit having kit components comprising an overhead tubular framework for attachment over a seating region of the recreational vehicle, the tubular framework including an overhead tubular cross member, the kit further comprising an accessory rail attached to or attachable to the cross member, the accessory rail including an accessory mounting portion having a T-slot for slidingly receiving a threaded fastener, one or more threaded fasteners receivable in the T-slot, packaging for the kit components, and instructions for installing the overhead tubular framework on the vehicle, for attaching accessories to the accessory rail, and for attaching the soft top to the overhead tubular framework.

2. The kit of claim 1, wherein the accessory rail is not attached to the overhead tubular cross member as part of the kit, and wherein the tubular cross member has holes with female threaded inserts therein at a location on the overhead tubular cross member for receiving the accessory rail.

3. The kit of claim 1, wherein the accessory rail is attached to or attachable to a rearward facing side of the overhead tubular cross member, the accessory rail having circumferentially arranged about the rail, an interface portion for interfacing with the overhead tubular cross member, a fixed anchor portion for receiving a forward edge portion of a soft top and the accessory mounting portion.

4. The kit of claim 3, wherein further comprising a soft top with an enlarged forward edge portion receivable in a slot of the fixed anchor portion, the soft top configured to be secured to the overhead tubular framework.

5. The kit of claim 3, wherein each of the interface portion, the fixed anchor portion, and the accessory mounting portion have, in cross section, a C-shape.

6. The kit of claim 5, wherein a pair of legs defining the C-shape of the interface portion are divergent.

7. The kit of claim 5, wherein a pair of legs defining the C-shape of the soft top anchor portion are converging.

8. The kit of claim 1, wherein the overhead tubular framework has a plurality of flange portions for attachment to the recreational vehicle.

9. A kit for adding accessories to a recreational vehicle forwardly and above a seating region of the recreational vehicle including an overhead tubular cross member, the kit comprising an accessory rail attachable to a cross member of an overhead tubular framework over the seating area, the accessory rail including a T-slot for slidingly receiving a threaded fastener, one or more threaded fasteners receivable in the T-slot, an interface portion for interfacing with the overhead tubular cross member.

10. The kit of claim 9, further comprising written instructions for installing the accessory rail to the overhead tubular cross member, and for attaching accessories to the accessory rail.

11. The kit of claim 9, wherein the accessory rail includes a fixed anchor portion with a slot.

12. The kit of claim 11, further comprising a soft top with an enlarged forward edge portion receivable in the slot of the fixed anchor portion, the soft top configured to be secured to the overhead tubular framework.

13. The kit of claim 9, wherein the kit includes the overhead tubular framework.

14. The kit of claim 9, wherein the overhead tubular framework is installed on the recreational vehicle.

15. The kit of claim 14, wherein the overhead tubular cross member has a plurality of threaded metal inserts, each clamped to a wall of the overhead tubular cross member, and wherein the accessory rail has a plurality of holes in alignment with the plurality of threaded metal inserts when the accessory rail is positioned for mounting on the overhead tubular cross member.

16. The kit of claim 13, wherein the accessory rail is not attached to the tubular cross member as part of the kit, and wherein the tubular cross member has holes with female threaded inserts therein on the tubular cross member for receiving the accessory rail.

17. A method of attaching one of more accessories forward and above a side by side seating region on a recreational vehicle, the method comprising the steps of:
    engaging and attaching an accessory rail to a cross member on the recreational vehicle, the cross member extending forwardly and above a viewing region with respect to a side by side seating region in the recreational vehicle, the accessory rail having a rearwardly facing T-slot when attached to the cross member;
    slidingly positioning a threaded fastener in the T-slot;
    attaching an accessory to the threaded fastener in the T-slot by way of using a cooperating threaded fastener with the threaded fastener in the T-slot.

18. The method of claim 17, further comprising attaching a soft top over the seating region by inserting a forward edge portion of the soft top into a slot of the accessory rail and extending and attaching the soft top above and rearwardly of the side by side seating region.

19. The method of claim 17, further comprising the step of attaching a tubular framework to the recreational vehicle over the side by side seating region, the tubular framework including the cross member.

20. The method of claim 18, further comprising the step of attaching a tubular framework to the recreational vehicle over the side by side seating region, the tubular framework including the cross member.

* * * * *